US012596770B2

(12) United States Patent
Pastore

(10) Patent No.: US 12,596,770 B2
(45) Date of Patent: Apr. 7, 2026

(54) SECURE FILE SHARING SYSTEM AND METHOD

(71) Applicant: Cyber Grant Inc, Menlo Park, CA (US)

(72) Inventor: Valerio Pastore, Milan (IT)

(73) Assignee: Cyber Grant Inc., Wilmington, DE (US)

( * ) Notice: Subject to any disclaimer, the term of this patent is extended or adjusted under 35 U.S.C. 154(b) by 224 days.

(21) Appl. No.: 18/706,797

(22) PCT Filed: Sep. 30, 2022

(86) PCT No.: PCT/IB2022/059336
§ 371 (c)(1),
(2) Date: May 2, 2024

(87) PCT Pub. No.: WO2023/079383
PCT Pub. Date: May 11, 2023

(65) Prior Publication Data
US 2025/0036789 A1     Jan. 30, 2025

(30) Foreign Application Priority Data
Nov. 3, 2021     (IT) ......................... 102021000027959

(51) Int. Cl.
*G06F 21/10* (2013.01)
*G06F 21/31* (2013.01)
*G06F 21/62* (2013.01)

(52) U.S. Cl.
CPC .............. *G06F 21/10* (2013.01); *G06F 21/31* (2013.01); *G06F 21/6209* (2013.01)

(58) Field of Classification Search
CPC ....... G06F 21/10; G06F 21/31; G06F 21/6209
See application file for complete search history.

(56) References Cited

U.S. PATENT DOCUMENTS 7,171,567 B1 *   1/2007   Bayer ..................... H04L 63/06
                                                          380/255
7,702,107 B1 *   4/2010   Messing ............... H04L 51/066
                                                          380/259

(Continued)

OTHER PUBLICATIONS

International Search Report from the International Searching Authority for International Application No. PCT/IB2022/059336 dated Jan. 11, 2023.

(Continued)

*Primary Examiner* — Aravind K Moorthy
(74) *Attorney, Agent, or Firm* — Widerman Malek, PL; Mark Malek

(57) ABSTRACT

A file sharing system is described, and includes a management electronic device, a sender electronic device associated with a first user and having access to an originating file, and a receiver electronic device associated with a second user. The electronic devices are connectable to a telecommunication network. The system is configured to encrypt the original file to obtain an encrypted file, insert the encrypted file and a link to the management device into a host file obtaining an enriched host file, accessing the enriched host file via the receiving device, and communicating with the management device via the link by activating an authorization procedure, decrypting the encrypted file, and making the encrypted file at least viewable at the receiving device when said procedure grants authorization to the second user.

11 Claims, 5 Drawing Sheets

(56)                References Cited

U.S. PATENT DOCUMENTS

| | | | | |
|---|---|---|---|---|
| 7,921,292 | B1 | 4/2011 | Pauker et al. | |
| 8,762,712 | B1* | 6/2014 | Kwan | H04L 9/0825 |
| | | | | 713/165 |
| 9,069,869 | B1* | 6/2015 | Quinn | G06F 16/9566 |
| 9,137,017 | B2* | 9/2015 | Fu | H04L 9/0894 |
| 9,813,412 | B1* | 11/2017 | Yang | H04L 63/145 |
| 9,959,280 | B1* | 5/2018 | Whitehead | G06F 16/13 |
| 10,296,594 | B1* | 5/2019 | Datta | G06F 16/128 |
| 10,873,852 | B1* | 12/2020 | Bernardi | H04L 9/3239 |
| 11,823,288 | B1* | 11/2023 | Hill | G06Q 10/40 |
| 2002/0013772 | A1 | 1/2002 | Peinado | |
| 2002/0069420 | A1* | 6/2002 | Russell | H04L 63/0428 |
| | | | | 725/92 |
| 2003/0046112 | A1* | 3/2003 | Dutta | G06Q 40/08 |
| | | | | 705/3 |
| 2004/0090466 | A1* | 5/2004 | Loveria, III | H04N 21/631 |
| | | | | 715/781 |
| 2004/0181490 | A1* | 9/2004 | Gordon | G06F 21/10 |
| | | | | 705/59 |
| 2005/0071632 | A1 | 3/2005 | Pauker et al. | |
| 2007/0050362 | A1* | 3/2007 | Low | G06F 21/6245 |
| 2007/0157072 | A1* | 7/2007 | LaBiche | G11B 27/322 |
| | | | | 707/E17.112 |
| 2008/0086421 | A1* | 4/2008 | Gilder | G06Q 20/108 |
| | | | | 705/44 |
| 2009/0084862 | A1* | 4/2009 | McCallum | E01B 23/06 |
| | | | | 238/12 |
| 2010/0250934 | A1* | 9/2010 | Watanabe | G06F 21/79 |
| | | | | 713/168 |
| 2011/0010541 | A1* | 1/2011 | Robert | G06F 21/62 |
| | | | | 380/278 |
| 2011/0170688 | A1* | 7/2011 | Evans | H04N 21/26613 |
| | | | | 380/210 |
| 2012/0216046 | A1* | 8/2012 | McDougal | H04L 63/1441 |
| | | | | 713/183 |
| 2012/0250857 | A1* | 10/2012 | Bosson | H04L 9/0825 |
| | | | | 707/E17.005 |
| 2012/0250862 | A1* | 10/2012 | Bosson | H04L 9/0841 |
| | | | | 707/E17.005 |
| 2012/0254125 | A1* | 10/2012 | Bosson | H04L 9/0822 |
| | | | | 707/E17.005 |
| 2012/0284370 | A1* | 11/2012 | Hierro | H04N 21/6373 |
| | | | | 709/219 |
| 2012/0284804 | A1* | 11/2012 | Lindquist | G06F 21/10 |
| | | | | 726/29 |
| 2013/0031636 | A1* | 1/2013 | Altschul | G06F 16/958 |
| | | | | 726/26 |
| 2013/0276064 | A1* | 10/2013 | Ignatchenko | G06F 21/74 |
| | | | | 726/3 |
| 2013/0305360 | A1* | 11/2013 | Yoshioka | H04L 63/123 |
| | | | | 726/22 |
| 2014/0053227 | A1* | 2/2014 | Ruppin | H04L 63/20 |
| | | | | 726/1 |
| 2014/0075582 | A1* | 3/2014 | Hierro | H04L 63/062 |
| | | | | 726/30 |
| 2014/0130185 | A1* | 5/2014 | Stappenbeck | G06F 21/105 |
| | | | | 726/28 |
| 2015/0106946 | A1* | 4/2015 | Soman | G06F 21/602 |
| | | | | 726/26 |
| 2015/0121063 | A1* | 4/2015 | Maller | H04L 63/0435 |
| | | | | 713/153 |
| 2015/0186621 | A1* | 7/2015 | Uy | G06F 21/109 |
| | | | | 726/26 |
| 2016/0134572 | A1* | 5/2016 | Logan | H04L 67/60 |
| | | | | 709/206 |
| 2016/0308840 | A1* | 10/2016 | Munshi | H04L 51/066 |
| 2016/0321459 | A1* | 11/2016 | Byszio | H04L 61/4511 |
| 2016/0380937 | A1* | 12/2016 | Murphy | H04L 51/18 |
| | | | | 709/206 |
| 2017/0054789 | A1* | 2/2017 | Jneid | H04L 63/145 |
| 2017/0243204 | A1* | 8/2017 | Murphy | H04L 51/08 |
| 2017/0317823 | A1 | 11/2017 | Gandhi et al. | |
| 2018/0019974 | A1* | 1/2018 | Maller | H04L 63/0218 |
| 2018/0204017 | A1* | 7/2018 | Panchbudhe | H04L 9/3242 |
| 2019/0124377 | A1* | 4/2019 | Chen | H04N 21/85406 |
| 2021/0319083 | A1* | 10/2021 | Bernardi | H04L 51/10 |
| 2022/0083685 | A1* | 3/2022 | Reyes | G06F 21/604 |
| 2022/0164445 | A1* | 5/2022 | Poleg | G06F 16/14 |

OTHER PUBLICATIONS

Written Opinion from the International Searching Authority for International Application No. PCT/IB2022/059336 dated Jan. 11, 2023.

* cited by examiner

100

1 (SRV)

4 SW-CRY

5 SW-MNG 3 (RCV)

6

7

2 (SND)

Figure 3:
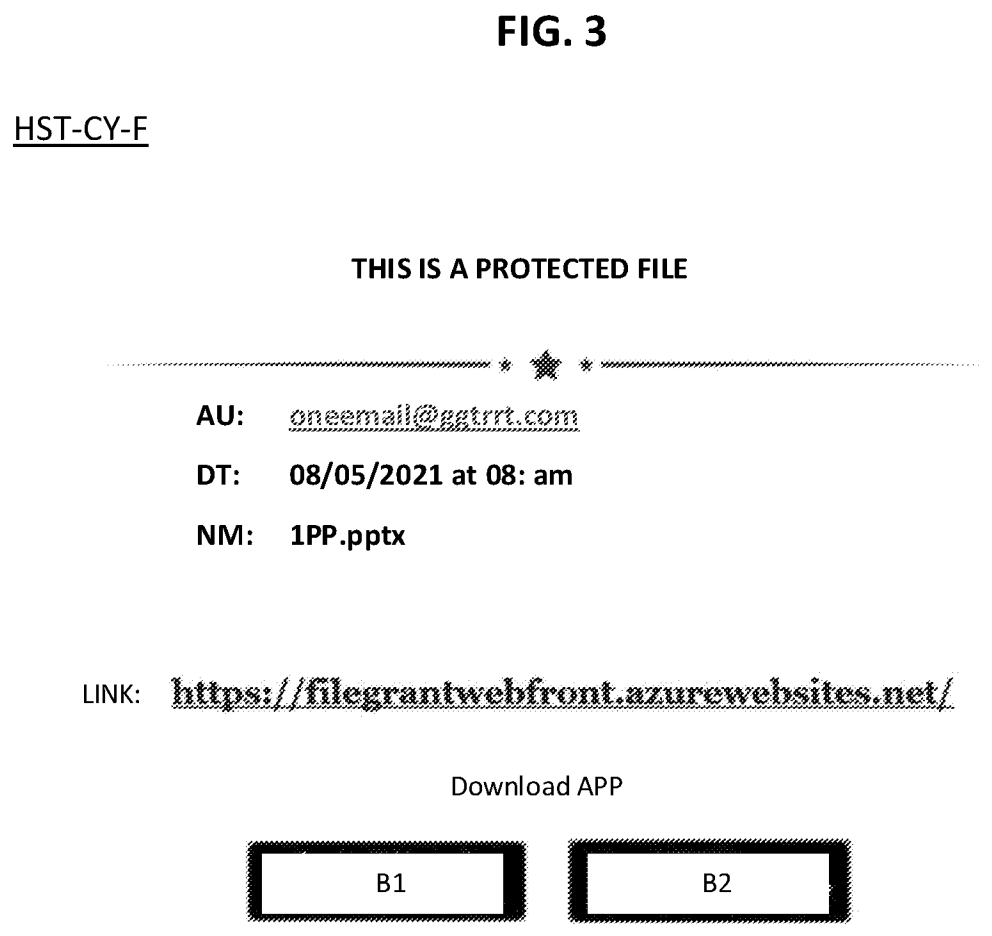

HST-CY-F

THIS IS A PROTECTED FILE

AU: oneemail@eeerrt.com

DT: 08/05/2021 at 08: am

NM: 1PP.pptx

LINK: https://filegrantwebfront.azurewebsites.net/

Download APP

| B1 | B2 |

<u>400</u>

500

SECURE FILE SHARING SYSTEM AND METHOD

RELATED APPLICATIONS

This application is a national phase application of, and claims priority under 35 U.S.C. § 371 to PCT application serial No. PCT/IB2022/059336, filed on Sep. 30, 2022 and titled SECURE FILE SHARING SYSTEM AND METHOD, which in turn, claims priority to Italian Patent Application No. 102021000027959 filed on Nov. 3, 2021 and titled SECURE FILE SHARING SYSTEM AND METHOD. The contents of each of these applications are incorporated herein by reference except for where the content therein conflicts with the content herein.

TECHNICAL FIELD

The present invention relates to file sharing and, more particularly, to encrypted file sharing.

STATE OF THE ART

As is well known, file sharing denotes the computer activity of sharing files within a computer network. In this same field, secure file sharing is the act of sharing files by protecting them from online threats and in such a way that they are accessible only by pre-selected people.

Secure file sharing is based, in many cases, on cryptographic techniques.

For example, one cryptography program is AxCrypt program that allows files to be encrypted using the Rindajel algorithm (AES 256).

Another encryption software is Boxcryptor which allows secure use of storage services and supports several cloud storage providers, such as: Dropbox, Google Drive, Microsoft OneDrive or SugarSync.

It is also known VeraCrypt application that allows to perform encryption of volumes and partitions, with different types of algorithms, so that with a key known to the encryptor it is possible to re-access the data. The VeraCrypt application allows for encryption of external devices (USB sticks) and the ability to create hidden, encrypted volumes, which are made visible only by launching the tool itself and entering the encryption key.

SUMMARY OF THE INVENTION

The present invention addresses the problem of providing an encrypted file sharing methodology, alternative to known file sharing methods, which is easy to use and which does not necessarily require that all of its users have file decryption software or are previously registered to a file sharing service.

According to a first aspect, it is an object of the present invention to provide a file sharing system as described by claim 1 and preferred embodiments thereof as defined by claims 1-10.

It is also an object of the present invention to provide a method of file sharing as described by claim 11.

BRIEF DESCRIPTION OF THE DRAWINGS

The present invention is hereinafter described in detail, by way of example and not limitation, with reference to the annexed drawings, in which FIG. 1 schematically shows a form of implementation of an encrypted file sharing system;

FIG. 3 shows an example of an enriched file host employed by said sharing system;

DETAILED DESCRIPTION

In this description, similar or identical elements or components will be indicated in the figures by the same identifying symbol.

Figure 1:
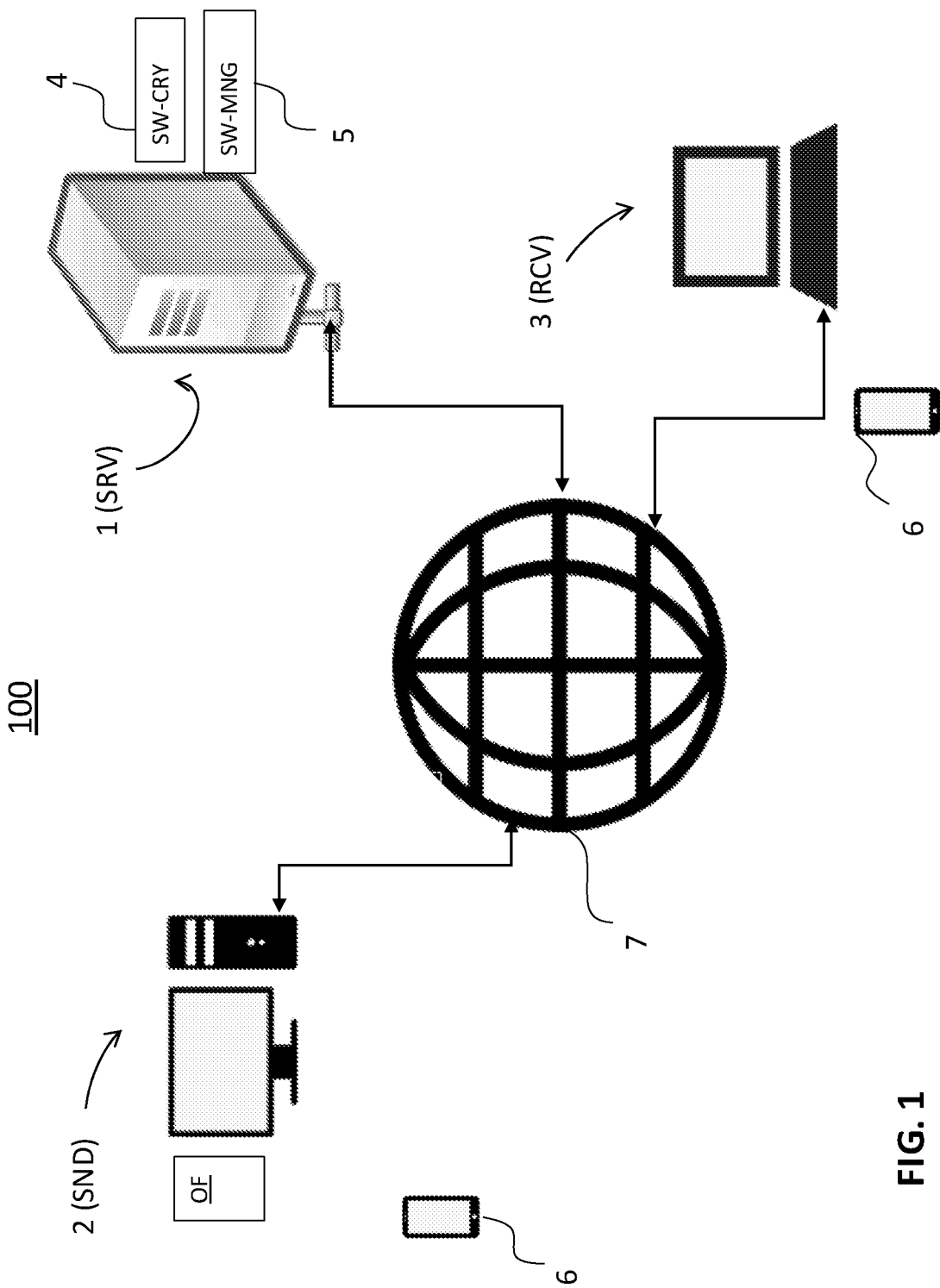

FIG. 1 schematically shows an encrypted file sharing system 100 comprising at least one management electronic device 1, at least one sender electronic device 2 and at least one recipient electronic device 3.

The management electronic device 1 may be a computer (such as a server computer) at which symmetric encryption software 4 (SW-CRY) and management software 5 (SW-MNG) reside.

For example, symmetric encryption software 4 is according to the AES (Advanced Encryption Standard) algorithm. The management software 5 is configured to manage the transmission and reception of information (e.g., messages) and/or data exchanged between the electronic devices of the sharing system 100.

The sender electronic device 2 is a computer such as a personal computer, lap top or tablet, or it may be a mobile phone (such as a smartphone 6) equipped with a corresponding application. Similar considerations apply to the recipient electronic device 3.

The management electronic device 1, the sender electronic device 2 and the recipient electronic device 3 are connected to a telecommunication network 7 for the exchange of data/information. The telecommunication network 7 is, for example, an Internet network.

According to an example embodiment, the sender electronic device 2 is used by a first user (also referred to hereinafter as "sender") who wishes to securely share an original file OF with a second user (also referred to hereinafter as "recipient") having the recipient electronic device 3.

An example of the operation of the sharing system 100 is described below, with reference to the figures.

According to the example, the sender is registered with the management computer 1 in order to use an encryption (i.e., cryptography) and file sharing service associated with the symmetric encryption software 4 and the management software 5. The recipient, which employs the recipient device 3, may not be registered to the file sharing service.

Note that the management software 5 may, according to one example, provide for managing the following procedure by also requiring the payment of a sum of money by the recipient. According to this example, the sender may decide whether to apply the procedure with payment or a procedure without payment for a given recipient.

Figure 2:
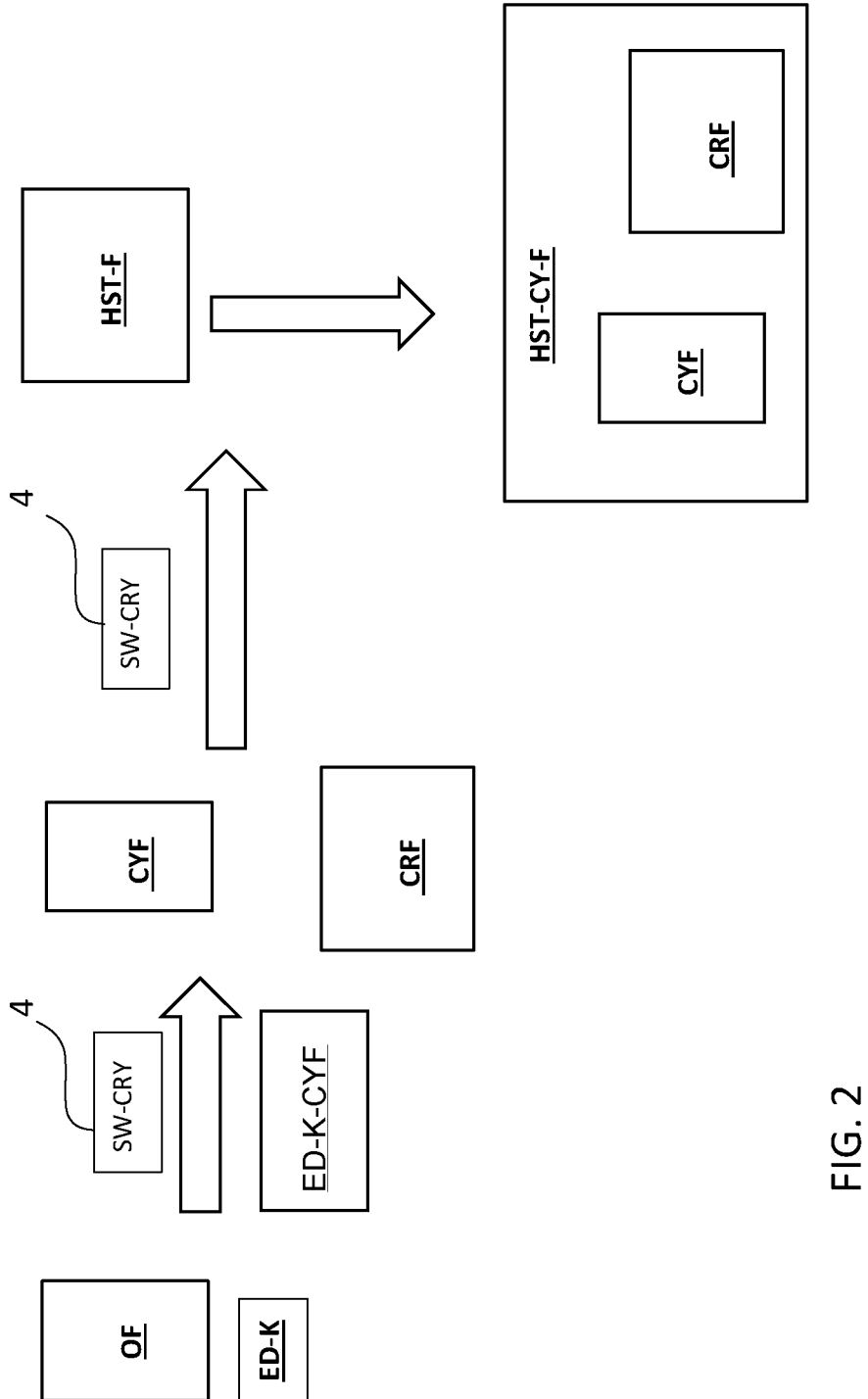
FIG. 2 schematically shows an example of a form of encryption of an original file.

The sender, using the relevant sender electronic device 2 connects via the Internet network 7 (by means of a browser software) to the management device 1 which initiates the execution of the management software 5 which may provide for the recognition of the first user, pre-registered to the service, and the opening of a dialogue web page with the sender. Subsequently, the sender uploads the original file OF to the web page and the management software 5 calls the encryption software 4 which operates on the original file OF and generates by means of a symmetric encryption algorithm an encrypted file CYF and, advantageously, also a certificate CRF (FIG. 2). The encryption operation can also be performed by means of a Client application installed on the sender electronic device 2 and downloadable from the management electronic device 1.

The certificate CRF is a file that contains information useful for recognising the origin of the encrypted file (e.g. name of the person who encrypted the file, date of encryption, etc.) is in a proprietary format.

To encrypt the original file OF, the encryption software 4 generates a symmetric encryption and decryption key ED-K. The symmetric key ED-K is in turn encrypted using a public key provided by the electronic management device 1 via the encryption software 4, the result of encrypting the symmetric key ED-K is a string ED-KCYF which is then stored within the certificate CRF.

Encryption software 4 also generates an host (guest) file HST-F chosen from one of the following file types (indicated by its extension): docx, pptx, xlsx and pdf.

Encryption 4 software inserts the encrypted file CYF into the host file HST-F, generating an enriched host file HST-CY-F. Note that, for example, a docx file may contain within it other file types (e.g., a pdf or a zipped file) introduced into it, e.g., by drag-and-drop or by a copy-paste command. In addition, the CRF certificate is also inserted, advantageously, within the enriched host file HST-CY-F.

In the enriched host file HST-CY-F there is also a link LINK (i.e. a hypertext address, which can be activated by its selection) to a web page controlled by Management Device 1. In addition, other data and information can be inserted in the enriched file HST-CY-F to be shown to the recipient.

As shown in a particular example depicted in FIG. 3, the enriched host file HST-CY-F (Office or PDF type) has a caption (in the example: 'This file is protected') that clarifies the presence of an encrypted file. Advantageously, neither the encrypted file CYF nor the certificate CRF are visible to the recipient when viewing the enriched host file HST-CY-F.

In addition, the enriched host file HST-CY-F may contain a caption identifying the author (AU), i.e., in this case, the sender (e.g., identified by his e-mail address) the date of creation (DT) of the original file (OF). FIG. 3 also shows a heading for the file name NM of the original file (OF), for example: 1PP.pptx.

In addition, FIG. 3 also shows the link to the web page operated by the management electronic device 1. According to a particular example, the enriched host file HST-CY-F in FIG. 3 also has two digital buttons (B1 and B2) that the recipient can use if he or she wishes to download a smartphone application to be used as a recipient electronic device 3 in place of a personal computer.

Figure 4:
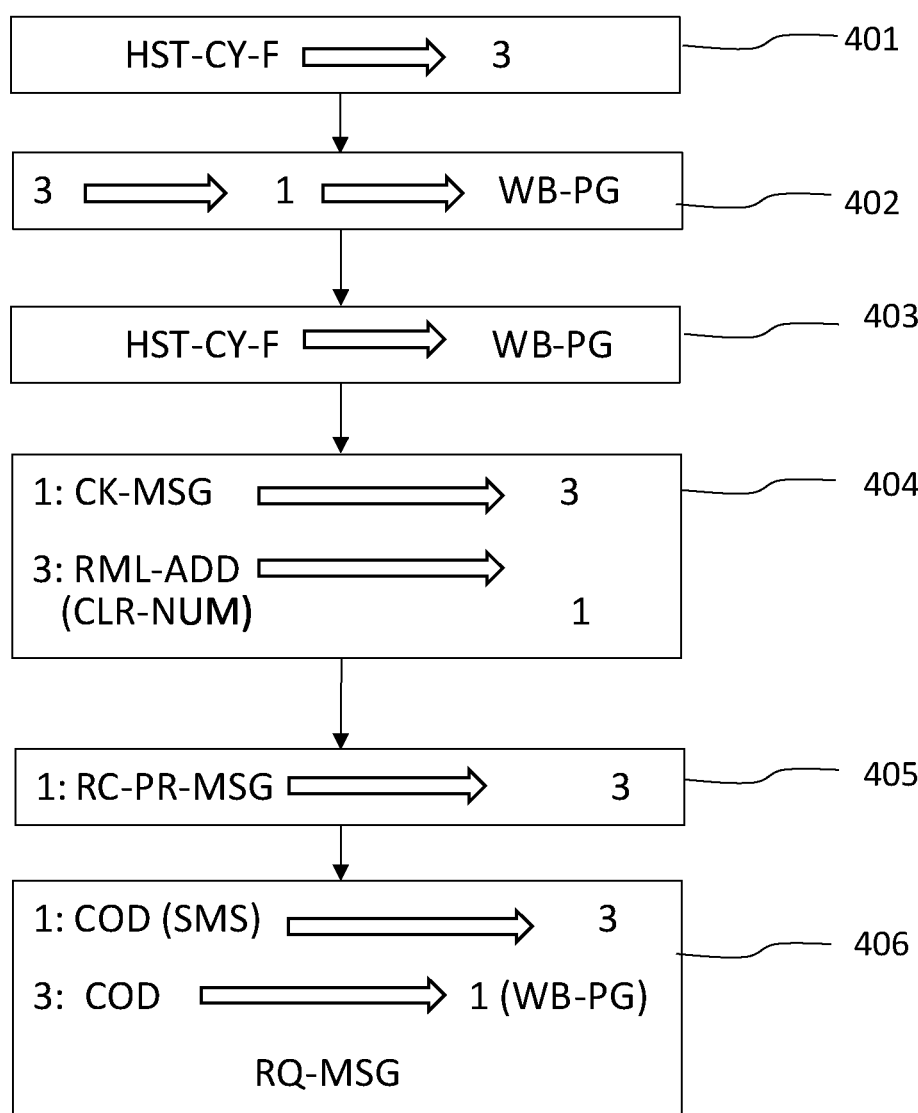
FIG. 4 shows, by way of example, a flow chart relating to a file decryption request procedure carried out by a recipient user.

The description of the method of operation continues with reference to flowchart 400 in FIG. 4.

Said enriched host file HST-CY-F is provided to the recipient (step 401) by, for example, an e-mail message to which it is attached and which is sent by the sender to the recipient. Sending by e-mail is not the only possible way of making the enriched host file HST-CY-F available to the recipient: according to another possible way, the enriched host file HST-CY-F can be delivered to the recipient by means of a portable memory. Delivery by means of a portable memory (for example, a USB stick) is also considered for the purposes of the present invention to be a mode of file sharing.

When the recipient opens the enriched host file HST-CY-F, using the recipient electronic device 3, he/she can read the information and data shown in it using any text file reader (Office in OOXML format) or standard PDF. Note that almost all PCs (Windows or MAC) have included in their operating system applications/displayers capable of reading and displaying the contents of the aforementioned files (already described with reference to the example in FIG. 3) on the screen. It should be noted that the recipient by reading what is shown in the enriched host file HST-CY-F is informed that he has received a protected, i.e. encrypted file sent to him by a particular sender. According to the known technique, encrypted files almost always have proprietary extensions (e.g. AxCrypt) and the recipient is unable to detect the nature of the file without having previously installed an application capable of decrypting its contents.

In order to proceed towards opening the original file OF, the recipient, using recipient electronic device 3, clicks on the link shown on the enriched host file HST-CY-F. The management electronic device 1 then opens a web page (WB-PG) which is displayed by the recipient to the corresponding electronic device 3 (step 402).

According to an example, the displayed web page WB-PG requests (e.g., by means of a text) the recipient to upload the enriched host file HST-CY-F to network 7. The recipient proceeds with this upload, in particular, by attaching or dragging the enriched host file onto the displayed web page WB-PG (step 403). When the upload is complete, the management device 1 analyses the enriched host file HST-CY-F provided to it by the recipient to verify that it does indeed contain an encrypted file.

Note that, advantageously, when using a related application (App) downloaded on the recipient's electronic device 3, it is not necessary for the recipient to click on the link shown on the enriched host file HST-CY-F: the same application opens the link (communicating in the back end with the management electronic device 1) and sends the certificate CRF to the management electronic device 1.

Subsequently, the management device 1 shows the recipient an initial message CK-MSG via a related web page, confirming that the check for the presence of an encrypted (i.e., protected) file has been passed, and also asks the recipient to upload its own e-mail address or mobile phone number to the web. The recipient then uploads its own e-mail address RML-ADD or mobile phone number CLR-NUM onto the web page. This e-mail address is not necessarily the same e-mail address to which the recipient may have received the enriched host file HST-CY-F (step 404).

In the case of a procedure with payment, it can be envisaged that the managing device 1 will also show the recipient, via the relevant web page, a message requesting payment. The recipient may then proceed to make the payment (e.g. by credit card).

In accordance with the described example, the management device 1 receives the e-mail address RML-ADD or the number CLR-NUM provided by the recipient and sends a second message (RC-PR-MSG) to the recipient electronic device 3 informing it that before the original file OF is made available it will initiate a procedure for authorisation of the recipient by the sender (step 405).

According to a particular form of implementation and for security reasons, after requesting the e-mail address or mobile phone number, the management device 1 sends an e-mail message or SMS message containing a control code COD to the e-mail address provided and/or the mobile phone number entered by the recipient and requests to upload this code to a web page.

The control code COD may be provided to the recipient by other means. The recipient uploads onto a web page (WB-PG) displayed to his electronic recipient device 3 this received code (step 406). In addition, the recipient may enter a third text message RQ-MSG (or voice message, or video) on this web page that will be displayed to the sender and that will help the sender recognise the recipient.

Figure 5:
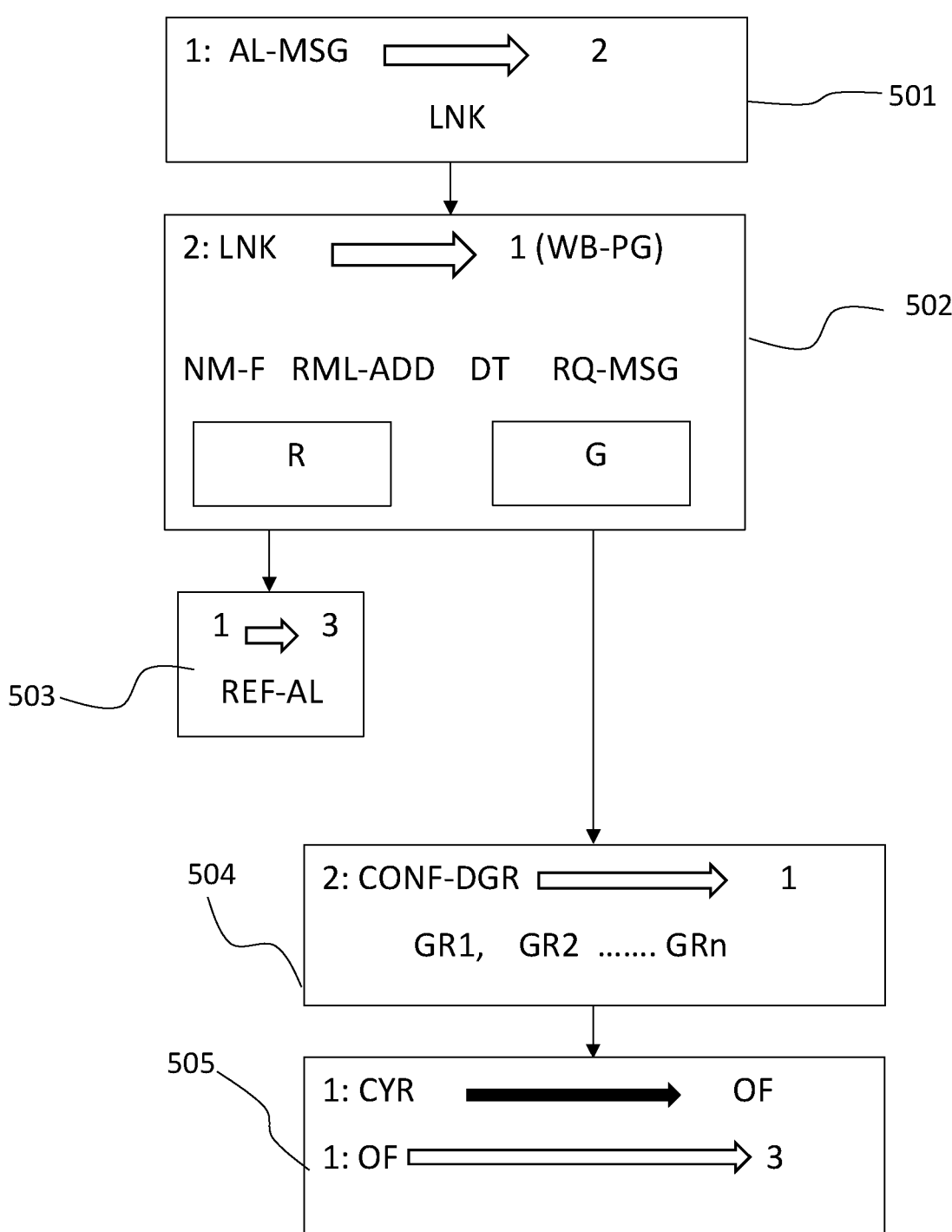
FIG. 5 shows, by way of example, a flow chart relating to an authorisation procedure for the decryption of an encrypted file by a sender for said recipient.

The management electronic device 1, after receiving the code and the aforementioned third message RQ-MSG, proceeds to send a warning message to the sender, as will be illustratively described with reference to the flowchart 500 of FIG. 5 referring to the authorisation procedure.

According to a particular mode, the management device 1 sends (step 501) to the sender electronic device 2 a warning message AL-MSG (e.g., by e-mail, by SMS or by Push systems) informing the sender about the presence of a request for authorisation to open the encrypted file. In addition, the alert message AL-MSG contains an additional link (LNK) to which the sender will connect to evaluate the authorisation request.

The sender opens the link (LNK) and displays (step 502) a web page (WB-PG) on which appears at least one of the following information relating to the encrypted and/or decrypted file and the recipient: name (NM-F) of the original file OF, the email address (RML-ADD) or mobile phone number (CLR-NUM) of the recipient (optionally also its IP address), the date of the request (DT), and the third message RQ-MSG (described with reference to step 406 in FIG. 4).

Furthermore, for example, such a web page contains a request (e.g. a text message) for approval of decryption of the encrypted file CYR which can be granted or rejected by the sender by selecting, for example, a digital approval button G or a digital rejection button R, respectively.

If the sender does not approve the decryption of the encrypted CYR file by selecting the button R, the management device 1 informs the recipient 3 of such refusal, for example, by means of the web, on which a refusal notice REF-AL appears (step 503). Furthermore, in the event of a refusal, the managing device 1 may ask the sender to indicate the reason for the refusal on the web, which is also communicated to the recipient.

If prior payment has been requested by the sender from the recipient, the management software 5 automatically verifies whether or not payment has been made. If payment has been made, authorisation to decrypt the encrypted file CYR is automatically granted, otherwise decryption is refused. According to this mode, the authorisation or refusal may not involve direct intervention by the sender, who initially decided to request payment for that recipient, but entrusts the decision to the management software 1 which verifies the prerequisite (successful payment) established by the sender.

In the event that the opening of the file has been approved, before proceeding to make the original file OF available to the recipient, it may be advantageously provided for the sender to set a degree of confidence or trust that the sender considers suitable for that recipient (step 504). This degree of confidence (CONF-DGR) confers different authorisations on the recipient in the use of the protected file sharing service. The degree of confidence CONF-DGR is associated with a recipient who, in particular, is identified by his e-mail and/or telephone number. For example, an initial degree of confidence (GR1) may be set by the sender, for which the recipient is only authorised to open the encrypted file CYF for which the request was made, and will then have to repeat the methodology described herein in the event that he/she has to decrypt other files provided by the sender.

In addition, a second degree of confidence (GR2) may be provided for which the recipient is authorised to open the encrypted file CYF and also other files from the sender, without having to ask the sender for authorisation again. Preferably, it is also possible for the sender to associate a maximum time duration (e.g. 3 months or 50 years) or a maximum number of decryption operations with this second degree of confidence.

Preferably, it is also possible to allow the sender to set particular modes of access to the original OF file as decrypted, such as, for example: allowing only the viewing of the decrypted file or also allowing it to be downloaded locally, printed out and whether or not to block its capture from the screen, whether or not to give the recipient the power to modify the file.

The degree of confidence (GR-DGR), the maximum time duration, the maximum number of operations, and the access mode are, preferably, modifiable by the sender.

Once the degree of confidence has been established, which is stored by electronic management device 1, the recipient will receive (on the displayed web page) an authorisation confirmation. The management device 1 proceeds to extract encrypted file CYF from the enriched host file HST-CY-F and to its decryption using the symmetric encryption software 4 (step 505).

To perform the decryption, the management device 1 uses the symmetric key ED-K derived from the decryption of the string ED-KCYF by means of the private key provided by the encryption software 4. The derived key ED-K also allows the remaining content of the certificate CRF to be read, in the same manner as the decryption of the file CYF.

It should be noted that when using a related application (App) downloaded to the recipient electronic device 3, the management electronic device 1 (when the authorisation by the sender has been completed) sends the encrypted but readable data only from the recipient electronic device 3, including the decryption key ED-K to be able to decrypt the file directly on the recipient electronic device 3, via the related application.

Then, the management device 1 shares the original OF file with the recipient electronic device 3 according to the authorisations set by CONF-DGR.

The system and method described above offer significant advantages.

The use of a host file in which to insert the encrypted file, followed by the procedure described, is a mode that allows the file to be shared with a recipient user who does not have an encryption application and who has no particular computer knowledge.

It should be noted that the method of sending encrypted documents to the recipient described is similar or identical to that used for sending a document in plain text (via email, WhatsApp, USB, etc.), whereas encryption software often makes sharing processes more difficult than with unprotected files.

The system described in fact does not necessarily require the recipient user to be surveyed or registered in advance, which allows the sender not necessarily to have to decide who should read the file before sending it.

The methodology described lends itself to a guided implementation of each of its individual steps and is therefore user-friendly.

These aspects are particularly relevant because they extend the effective use of encryption to users with all kinds of backgrounds.

In addition, the fact that decryption is subject to authorisation by the sender (permission on demand) constitutes an entirely innovative approach in the field of stand-alone file sharing, which simplifies file exchange procedures (via any channel) without sacrificing security protection. Note that all described information/data exchanges can be carried out in real time.

LEGEND OF FIGURE SYMBOLS encrypted file sharing system 100
electronic management device 1
sender electronic device 2
recipient electronic device 3
symmetric encryption software 4
management software 5
smartphone 6
telecommunications network 7
original file OF
encrypted file CYF
certificate CRF
encryption and decryption key ED-K
encrypted encryption key ED-KCYF
host file HST-F
enriched host file HST-CY-F
link LINK
author name AU
creation date DT
file name NM
digital buttons B1 and B2
flowchart 400
web page WB-PG
first message CK-MSG
e-mail address of recipient RML-ADD
recipient mobile phone number CLR-NUM
second message RC-PR-MSG
control code COD
third text message RQ-MSG
warning message AL-MSG
digital approval button G
digital rejection approval button R
rejection warning REF-AL
confidence level (CONF-DGR)
first and second confidence level GR1 and GR2
The invention claimed is:

1. A file sharing system comprising:
an electronic management device equipped with symmetric encryption software and management software;
a sender electronic device associated with a first user and having access to an original file;
a recipient electronic device associated with a second user;
wherein the electronic management device, the sender electronic device and the recipient electronic device are connectable to a telecommunication network for an exchange of data/information;
wherein the system, said symmetric encryption software, and the management software are configured to:
encrypt the original file to obtain an encrypted file-using a private key that is unknown to the recipient electronic device;
insert inside a host file the encrypted file and a link to the electronic management device obtaining an enriched host file having one of the following types: docx, pptx, xlsx, pdf;
access the enriched host file through the recipient electronic device and communicate with the management electronic device through the link by activating an authorization procedure;

carry out the authorization procedure by means of a data/information exchange between the electronic management device, the sender electronic device and the recipient electronic device to provide an authorization to the second user; and
decrypt the encrypted file by the electronic management device to define a decrypted file, and make the decrypted file at least viewable at the recipient electronic device when the authorization is granted to the second user.

2. The system according to claim 1, wherein:
the authorization procedure comprises:
sending a request for authorization to decrypt the encrypted file to the sender electronic device;
receiving to the electronic management device from the sender electronic device an authorization rejection response or a grant authorization response.

3. The system according to claim 2, wherein the management software is further configured to:
send by the sender electronic device to the electronic management device information defining a degree of confidence that the first user associates with the second user.

4. The system according to claim 3, wherein said degree of confidence is selectable by the first user from a plurality of degrees of confidence conferring on the second user various powers selected from the following group of powers: enablement to exclusively open said encrypted file; enablement to open further encrypted files without repeating said authorization procedure; enablement to open one or more encrypted files for a predetermined period of time; enable the display of the decrypted file, enable the local download of the decrypted file, enable the printing of the decrypted file, enable the screen capture of the decrypted file, enable the modification of the decrypted file.

5. The system according to claim 2, wherein the electronic management device is configured such that sending to the sender electronic device a request for authorization to decrypt the encrypted file comprises sending at least one of the following: a name of the original file, an email address, a cell phone number associated with the second user, an address of said recipient electronic device, a date of the request to open the encrypted file, and request message provided by the recipient electronic device.

6. The system according to claim 1, wherein the enriched host file is such that it can be provided to the recipient electronic device by e-mail and/or by means of a portable storage device.

7. The system according to claim 1, wherein said recipient electronic device is configured to open the enriched host file that is viewable using the recipient electronic device; wherein said enriched host file further comprises at least one of: an indication that an encrypted file is present; a wording identifying the first user; a creation date.

8. The system according to claim 1, wherein the system is configured to:
access the enriched host file by selection of said link included in the enriched host file and opening a web page that is displayed by the second user to the recipient electronic device;
request, by the electronic management device, the second user associated with the recipient electronic device to upload the enriched host file to the web page;
send the enriched host file by the electronic management device to verify a presence of said encrypted file;

request the second user from the electronic management device to upload a recipient e-mail address to the web page.

9. The system according to claim 8, wherein the system is configured for:

send, by the electronic management device, to the second user associated with the recipient electronic device a control code;

request, by the electronic management device, the second user associated with the recipient electronic device to upload said control code to the web page.

10. The system according to claim 9, wherein the system is configured to: upload by the second user onto the web page a message to be returned to the first user to recognize the second user.

11. A method of sharing files, comprising:

providing an electronic management device equipped with a symmetric encryption software and a management software;

providing a sender electronic device associated with a first user and having access to an original file;

providing a recipient electronic device associated with a second user, wherein the electronic management device, the sender electronic device and the recipient electronic device are connectable to a telecommunications network for a data/information exchange;

encrypting the original file to obtain an encrypted file using the symmetric encryption software, the management software and a private key unknown to the recipient device;

inserting inside a host file the encrypted file and a link to the electronic management device obtaining an enriched host file having one of the following types: docx, pptx, xlsx, pdf;

accessing the enriched host file through the recipient electronic device and communicating with the electronic management device through the link by activating an authorization procedure;

carrying out the authorization procedure by means of a data/information exchange between the electronic management device, the sender electronic device and the recipient electronic device;

decrypting the encrypted file by the electronic management device to define a decrypted file, and making the decrypted file at least viewable at the recipient electronic device when the authorization is granted to the second user.

* * * * *